(12) United States Patent
Fan et al.

(10) Patent No.: US 9,871,458 B2
(45) Date of Patent: Jan. 16, 2018

(54) RESONANT RECTIFYING DEVICE, CONTROL METHOD AND APPARATUS FOR RESONANT RECTIFYING

(71) Applicant: Xiaomi Inc., Beijing (CN)

(72) Inventors: Jie Fan, Beijing (CN); Xinming Shi, Beijing (CN); Wei Sun, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/090,738

(22) Filed: Apr. 5, 2016

(65) Prior Publication Data

US 2016/0294299 A1 Oct. 6, 2016

Related U.S. Application Data

(63) Continuation of application No. PCT/CN2015/093852, filed on Nov. 5, 2015.

(30) Foreign Application Priority Data

Nov. 21, 2014 (CN) .......................... 2014 1 0676697

(51) Int. Cl.
*H02M 3/335* (2006.01)
*H02M 1/00* (2006.01)

(52) U.S. Cl.
CPC .................. *H02M 3/33592* (2013.01); *H02M 2001/0058* (2013.01); *Y02B 70/1433* (2013.01); *Y02B 70/1475* (2013.01); *Y02B 70/1491* (2013.01)

(58) Field of Classification Search
CPC .. H02M 1/08; H02M 3/33507; H02M 3/3353; H02M 3/33546; H02M 3/33569; H02M 3/33576; H02M 3/33592

(Continued)

(56) References Cited

U.S. PATENT DOCUMENTS 6,934,167 B2 * 8/2005 Jang .................. H02J 5/005
                                                363/21.02
7,193,866 B1   3/2007 Huang
                     (Continued)

FOREIGN PATENT DOCUMENTS

| CN | 102355147 A | 2/2012 |
| CN | 104333240 A | 2/2015 |
| JP | 2005-198438 A | 7/2005 |

OTHER PUBLICATIONS

International Search Report of PCT International Application No. PCT/CN2015/093852, issued by the State Intellectual Property Office of China as ISA, dated Jan. 26, 2016 (5 pages).

(Continued)

*Primary Examiner* — Jeffrey Sterrett
(74) *Attorney, Agent, or Firm* — Finnegan, Henderson, Farabow, Garrett & Dunner LLP (57) ABSTRACT

A resonant rectifying device includes a transformer having a primary winding and a secondary winding, a primary-side circuit coupled to the primary winding of the transformer, and a secondary-side circuit coupled to the secondary winding of the transformer. The primary-side circuit includes a first field effect transistor (FET) and a second FET coupled in series between a voltage source and a ground, a capacitor, and an inductor. A first side of the capacitor is coupled to a point between the first and the second FETs. A second side of the capacitor is coupled to a first end of the inductor and one end of the primary winding. A second end of the inductor is coupled to the ground. The secondary-side circuit includes a third FET and a fourth FET coupled to a first end and a second end of the secondary winding, respectively.

12 Claims, 7 Drawing Sheets

(58) Field of Classification Search
USPC .......................... 363/21.02, 21.06, 21.14, 97
See application file for complete search history.

(56) References Cited

U.S. PATENT DOCUMENTS

| | | | |
|---|---|---|---|
| 8,040,696 B2 | 10/2011 | Wu et al. | |
| 8,400,787 B2 | 3/2013 | Wu et al. | |
| 8,665,611 B2 | 3/2014 | Gong | |
| 9,030,846 B2* | 5/2015 | Bai .................... | H02M 3/33592 363/21.02 |
| 2009/0097280 A1 | 4/2009 | Wu et al. | |
| 2012/0026755 A1 | 2/2012 | Wu et al. | |
| 2012/0033453 A1 | 2/2012 | Gong | |
| 2013/0170252 A1* | 7/2013 | Nishino ................. | H02M 1/08 363/21.02 |
| 2014/0098574 A1* | 4/2014 | Hara ................. | H02M 3/33592 363/21.02 |
| 2015/0229220 A1* | 8/2015 | Lee ......................... | H02M 1/32 363/21.03 |
| 2015/0326133 A1* | 11/2015 | Lin .................... | H02M 3/33569 363/21.02 |
| 2016/0057822 A1* | 2/2016 | Chu .................... | H02M 1/4208 315/201 |
| 2016/0294299 A1* | 10/2016 | Fan ................... | H02M 3/33592 |

OTHER PUBLICATIONS

*AN-6208—Secondary-Side Synchronous Rectifier (SR) for LLC Resonant Converter Using FAN6208*, Mar. 10, 2011. Fairchild Semiconductor, www.fairchildsemi-com, 12 pages.

Wang et al., *Research on Key Application Issues of Smart Synchronous Rectifier Driver IC in LLC Resonant Converter*, IEEE, 2011, pp. 2765-2770,.

\* cited by examiner

RESONANT RECTIFYING DEVICE, CONTROL METHOD AND APPARATUS FOR RESONANT RECTIFYING

CROSS-REFERENCE TO RELATED APPLICATIONS

This application is a continuation of International Application No. PCT/CN2015/093852, Filed on Nov. 5, 2015, which is based upon and claims priority to Chinese Patent Application No. 201410676697.4, filed on Nov. 21, 2014, the entire contents of both of which are incorporated herein by reference.

TECHNICAL FIELD

The present disclosure relates to application circuit technology and, more particularly, to a resonant rectifying device, and a method and apparatus for controlling resonant rectification.

BACKGROUND

Transformers are used in electronic devices for providing power to the electronic devices. In conventional technology, power is transferred from the primary side of a transformer to an output circuit of the secondary side of the transformer mainly by means of resonance. More specifically, after a boosting circuit boosts an input voltage to a preset voltage, a half bridge circuit constituted of two field effect transistors (FETs) controls the preset voltage to charge a capacitor, which is coupled to the transformer in series. The capacitor and the transformer form an LC resonant circuit. Power of the resonant circuit is transferred from the primary side to the secondary side by the transformer. After receiving the power, the secondary side transfers the power to a load via a rectifying diode.

SUMMARY

In accordance with the present disclosure, there is provided a resonant rectifying device including a transformer having a primary winding and a secondary winding, a primary-side circuit coupled to the primary winding of the transformer, and a secondary-side circuit coupled to the secondary winding of the transformer. The primary-side circuit includes a first field effect transistor (FET) and a second FET coupled in series between a voltage source and a ground, a capacitor, and an inductor. A first side of the capacitor is coupled to a point between the first and the second FETs. A first end of the inductor is coupled to a first end of the primary winding and to a second side of the capacitor. A second end of the inductor is coupled to the ground. The secondary-side circuit includes a third FET and a fourth FET. A first end of the third FET is coupled to a first end of the secondary winding. A first end of the fourth FET is coupled to a second end of the secondary winding. A second end of the third FET and a second end of the fourth FET are coupled to each other, and are coupled to an output terminal of the secondary-side circuit.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In conventional technology, diodes are usually used in the secondary side of a resonant rectifying circuit. Since diodes are always on, the secondary side always includes a complete discharge loop. Even when current is not needed in the secondary side, a small current can still exist in the secondary side due to the coupling of the primary side, causing a power loss. Further, this small current may prevent a coupling current from reaching a power level required by the load, resulting in unstable operation of the load. In addition, a magnetic flux leakage may exist in the transformer, which may affect the surrounding magnetic field. Thus, the diodes, which are always turned on, may cause current spikes generated by the magnetic flux leakage to be transferred to the secondary side, which in turn cause current spikes to be generated in the secondary side. As a result, the load apparatus may be damaged.

According to the present disclosure, diodes in the secondary side of the resonant rectifying circuit are replaced with field effect transistors (FETs), such as metal-oxide-semiconductor (MOS) transistors, which may prevent magnetic flux leakage and coupling current lost. In addition, an inductor is added at the primary side of the resonant rectifying circuit to prevent inductance leakage.

Figure 1:
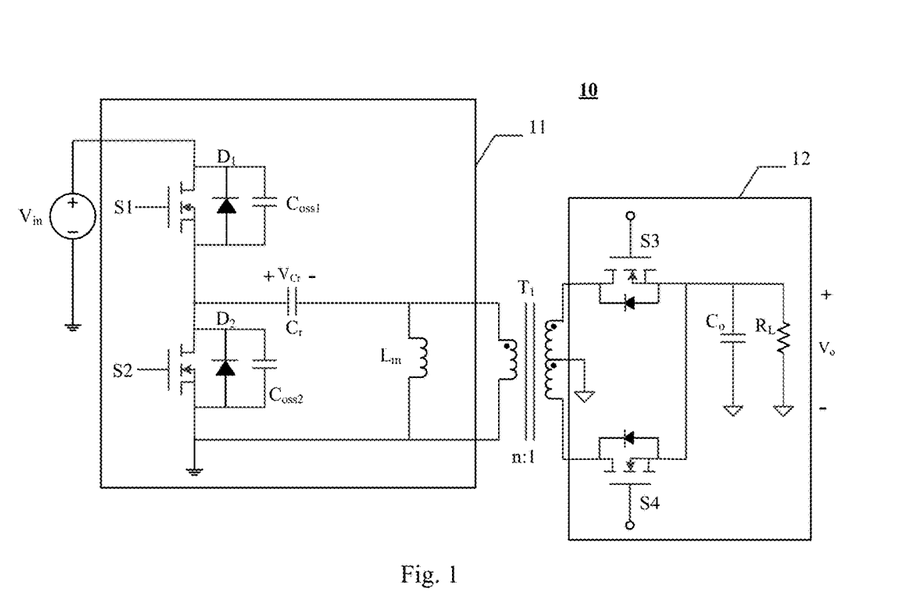
FIG. 1 is a circuit diagram of a resonant rectifying device according to an exemplary embodiment.

FIG. 1 is a circuit diagram of a resonant rectifying device 10 according to an exemplary embodiment. As illustrated in FIG. 1, the device 10 includes a primary-side module 11, a transformer T1, and a secondary-side module 12. The primary-side module 11 transfers power to the secondary-side module 12 via the transformer T1. The primary-side module 11 is coupled to a primary winding of the transformer T1, and is also referred to as a primary-side circuit, an input module, or an input circuit. The secondary-side module 12 is coupled to a secondary winding of the transformer T1, and is also referred to as a secondary-side circuit, an output module, or an output circuit.

The primary-side module 11 includes a first MOS transistor S1 and a second MOS transistor S2 coupled together in series between a voltage source $V_{in}$ and a ground. A first junction capacitor $C_{oss1}$ is formed between a source and a drain of the first MOS transistor S1. A second junction capacitor $C_{oss2}$ is formed between a source and a drain of the second MOS transistor S2. Although in FIG. 1, the first and second junction capacitors $C_{oss1}$ and $C_{oss2}$ are indicated using individual symbols for the purpose of illustration, one of ordinary skill in the art would understand that the first and second junction capacitors $C_{oss1}$ and $C_{oss2}$ are not components separate from the first and second MOS transistors S1 and S2, but are intrinsically formed in the first and second MOS transistors S1 and S2, respectively. Further, a first body diode $D_1$ and a second body diode $D_2$ are formed in the first and second MOS transistors S1 and S2, respectively. Similar to the first and second junction capacitors $C_{oss1}$ and $C_{oss2}$, the first and second body diodes $D_1$ and $D_2$ are indicated using individual symbols in FIG. 1 for the purpose of illustration. One of ordinary skill in the art would understand that the first and second body diodes $D_1$ and $D_2$ are not components separate from the first and second MOS transistors S1 and S2.

As shown in FIG. 1, the primary-side module 11 further includes a first inductor $L_m$ coupled to both ends of the primary winding of the transformer T1. One end of the first inductor $L_m$ is coupled to a point between the first MOS transistor S1 and the second MOS transistor S2 via a first capacitor $C_r$, and the other end of the first inductor $L_m$ is coupled to the ground.

The secondary-side module 12 includes a third MOS transistor S3 having a drain connected to one end of the secondary winding of the transformer T1 and a fourth MOS transistor S4 having a drain connected to the other end of the secondary winding of the transformer T1. A source of the third MOS transistor S3 and a source of the fourth MOS transistor S4 are coupled together. As shown in FIG. 1, a body diode is formed in each of the third and fourth MOS transistors S3 and S4 between corresponding source and drain. Further, the drains of the third and fourth MOS transistors S3 and S4 are also coupled to an output terminal of the secondary-side module 12, which is coupled to a load $R_L$ via a second capacitor $C_o$. The second capacitor $C_o$ is coupled in parallel with the load $R_L$. The load $R_L$ is also referred to herein as a load resistance, and the second capacitor $C_o$ is also referred to herein as an output capacitor.

According to the present disclosure, the third MOS transistor S3 and fourth MOS transistor S4 can effectively disconnect the circuit loop of the secondary side of the resonant rectifying device 10, thereby decreasing or eliminating the influence on the load due to coupling. In addition, during operation of the resonant rectifying device 10, the MOS transistors in the primary side are first turned on, and then the MOS transistors in the secondary side are turned on after a certain delay time. Similarly, when the resonant rectifying device 10 is being turned off, the MOS transistors in the secondary side are first turned off, and then the MOS transistors in the primary side are turned off after a certain delay time. Therefore, the influence of magnetic flux leakage on the load can be effectively avoided. As such, synchronous rectifying is realized, the converting efficiency is increased, the operating stability of the load apparatus is increased, the load apparatus is effectively protected, and damage to the load apparatus is avoided. In addition, zero voltage switching technology can be utilized and thus power consumption of the MOS transistors can be reduced.

Figure 2:
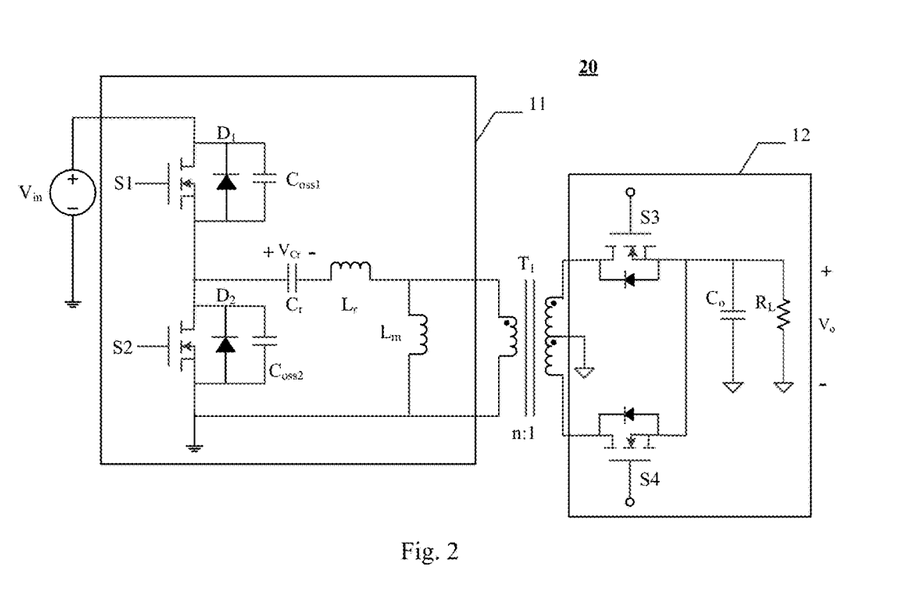
FIG. 2 is a circuit diagram of a resonant rectifying device according to another exemplary embodiment.

FIG. 2 is a circuit diagram of a resonant rectifying device 20 according to another exemplary embodiment. The resonant rectifying device 20 is similar to the resonant rectifying device 10, except that the primary-side module 11 in the resonant rectifying device 20 further includes a second inductor $L_r$ coupled in series with the first capacitor $C_r$. One end of the first inductor $L_m$ is coupled to the point between the first MOS transistor S1 and the second MOS transistor S2 via the first capacitor $C_r$ and the second inductor $L_r$.

In the resonant rectifying device 20, the second inductor $L_r$ is added in the primary side to compensate for the decrease of inductance value due to inductance leakage. Therefore, the actual resonant frequency of the resonant rectifying device 20 can equal or be greater than a theoretical resonant frequency, such that the resonant point can fall within an inductive region. As such, the inductance leakage is reduced or avoided, and the power converting efficiency is improved.

Figure 3:
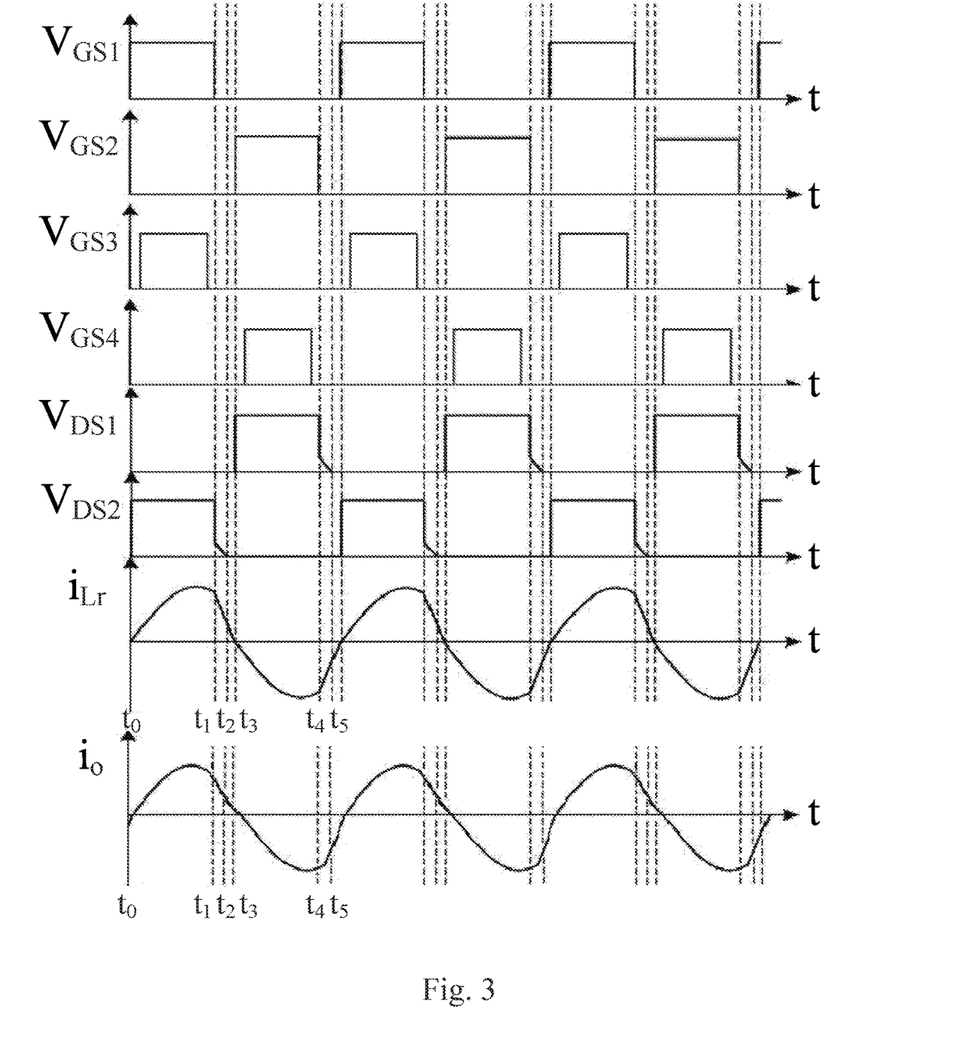
FIG. 3 is a circuit operation timing diagram of a resonant rectifying device according to an exemplary embodiment.

An exemplary method for controlling the resonant rectifying device 20 according to the present disclosure is described below in connection with FIGS. 3-9. FIG. 3 is a circuit operation timing diagram of the resonant rectifying device 20 according to an exemplary embodiment. As illustrated in FIG. 3, one operating period of the resonant rectifying device 20 is divided into five time segments, i.e., a first time segment from t0 to t1, a second time segment from t1 to t2, a third time segment from t2 to t3, a fourth time segment from t3 to t4, and a fifth time segment from t4 to t5. In FIG. 3, $V_{GS1}$, $V_{GS2}$, $V_{GS3}$, and $V_{GS4}$ represent the gate-source voltages of the first, second, third, and fourth MOS transistors S1, S2, S3, and S4, respectively. $V_{DG1}$ and $V_{DG2}$ represent the drain-gate voltages of the first and second MOS transistors S1 and S2, respectively. Further, $i_{Lr}$ represents the current in the second inductor $L_r$ and $i_o$ represents the output current to the load $R_L$.

Figure 4:
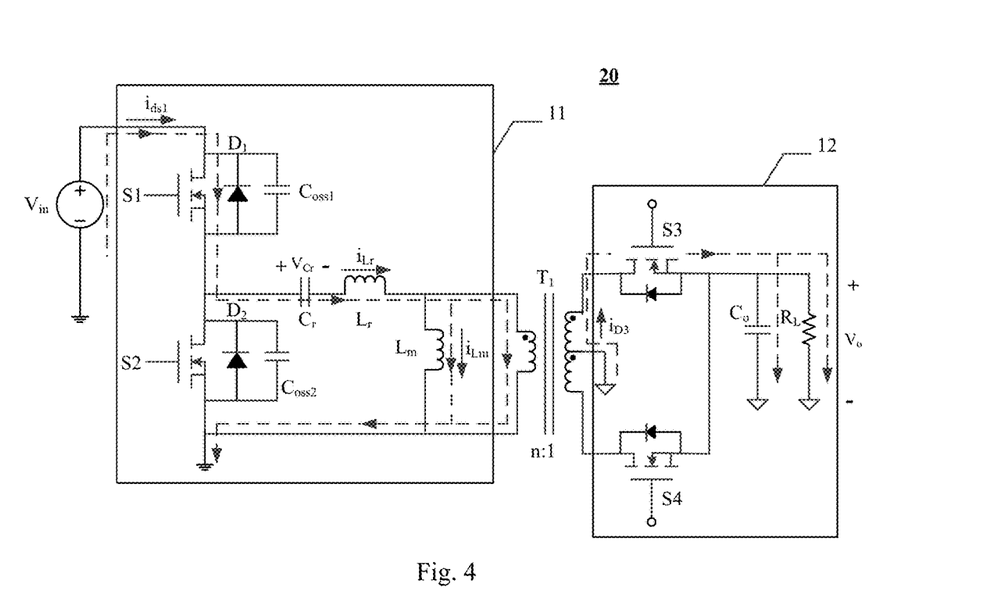
FIG. 4 schematically shows directions of currents in the resonant rectifying device during a first time segment of an operation period of the resonant rectifying device.

FIG. 4 schematically shows directions of various currents in the resonant rectifying device 20 during a certain period within the first time segment. In FIG. 4 and subsequent FIGS. 5-8, dashed lines and dashed arrows indicate current flows and current flow directions, respectively, while solid arrows indicate directions of current changes. For a certain current, when the corresponding dashed and solid arrows are in the same direction, the current is increasing, while when the corresponding dashed and solid arrows are in opposite directions, the current is decreasing. For example, in FIG. 4, the dashed and solid arrows for current $i_{ds1}$ both point to right. This means that during the first time segment, current $i_{ds1}$ flows from left to right and increases. On the other hand, in FIG. 5, the dashed arrow for current $i_{ds1}$ points to right while the solid arrow for current $i_{ds1}$ points to left. This means that during the second time segment, current $i_{ds1}$ flows from left to right and decreases.

As shown in FIG. 3, during the first time segment, the first MOS transistor S1 is first turned on and thus the primary-side module 11 starts to receive power from a power source $V_{in}$. When the first MOS transistor S1 is turned on, the third MOS transistor S3 is kept off. Then, after a certain delay time, the third MOS transistor S3 is turned on, such that the power stored in the primary-side module 11 is transferred to the secondary-side module 12 via the transformer T1, and the secondary-side module 12 stores the power. During the period that the third MOS transistor S3 is on, as shown in FIG. 3, the current $i_{Lr}$ gradually increases. The status of the currents during this period is shown in FIG. 4. After the current $i_{Lr}$ reaches a maximum, stable value, the third MOS transistor S3 is first turned off. After the third MOS transistor S3 is completely turned off, the primary-side module 11 stops transferring power to the secondary-side module 12. Then, a certain delay time after the third MOS transistor S3 is turned off, the first MOS transistor S1 is also turned off at time t1. As used herein, a MOS transistor being turned off refers to the gate-source voltage $V_{GS}$ of that MOS transistor being cut off. The MOS transistor will be completely turned off after a certain amount of time.

Figure 5:
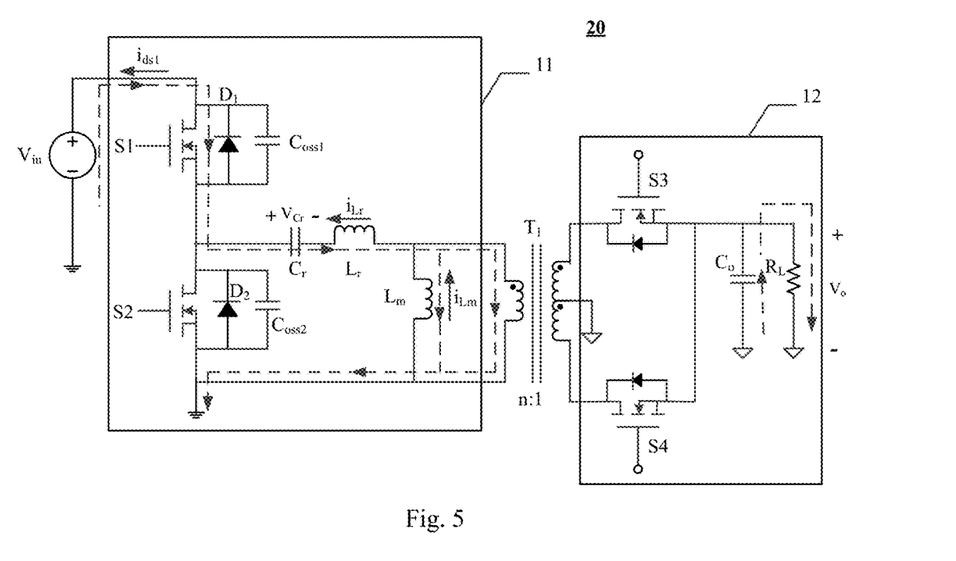
FIG. 5 schematically shows directions of currents in the resonant rectifying device during a second time segment of the operation period.

FIG. 5 schematically shows directions of various currents in the resonant rectifying device 20 within the second time segment. As shown in FIG. 3, during the second time segment, the first MOS transistor S1, the second MOS transistor S2, the third MOS transistor S3, and the fourth MOS transistor S4 are all turned off. During the second time segment, since the third MOS transistor S3 has been completely turned off, the primary-side module 11 does not transfer power to the secondary-side module 12. The secondary-side module 12 starts to output power. Further, current in the second inductor $L_r$ continues to flow. Meanwhile, the first junction capacitor $C_{oss1}$ of the first MOS transistor S1 is charged by current $i_{ds1}$, as shown in FIG. 5.

Figure 6:
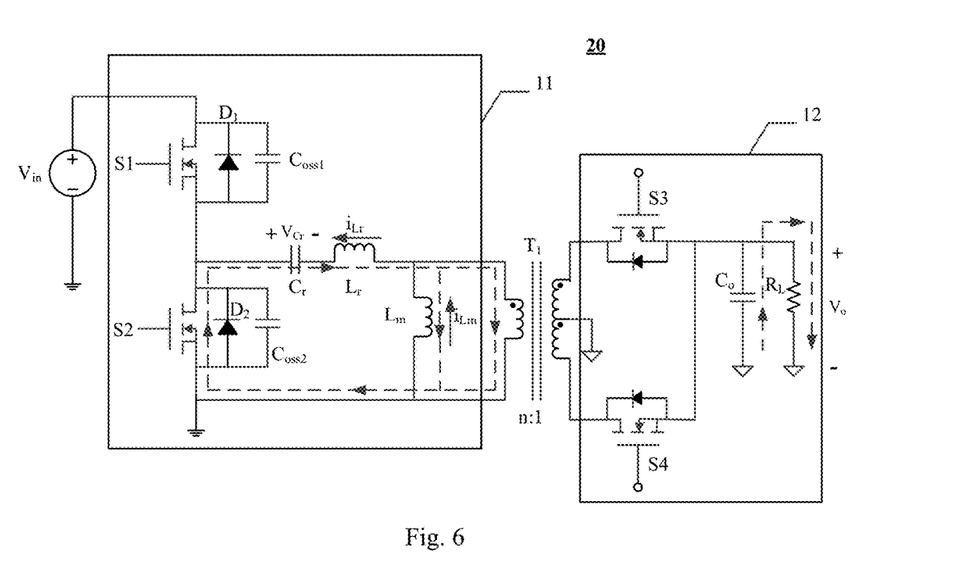
FIG. 6 schematically shows directions of currents in the resonant rectifying device during a third time segment of the operation period.

FIG. 6 schematically shows directions of various currents in the resonant rectifying device 20 within the third time segment. As shown in FIG. 3, during the third time segment, the first MOS transistor S1, the second MOS transistor S2, the third MOS transistor S3, and the fourth MOS transistor S4 are kept off. The primary-side module 11 does not transfer power to the secondary-side module 12, and the secondary-side module 12 outputs power.

As shown in FIG. 6, the second junction capacitor $C_{oss2}$ of the second MOS transistor S2 discharges. According to the present disclosure, the second junction capacitor $C_{oss2}$ starts to discharge when the first MOS transistor S1 is completely turned off, and is completely or almost completely discharged during the third time segment, so that the second MOS transistor S2 is in a zero voltage switching state when it is turned on at time t3, i.e., the beginning of the fourth time segment.

Figure 7:
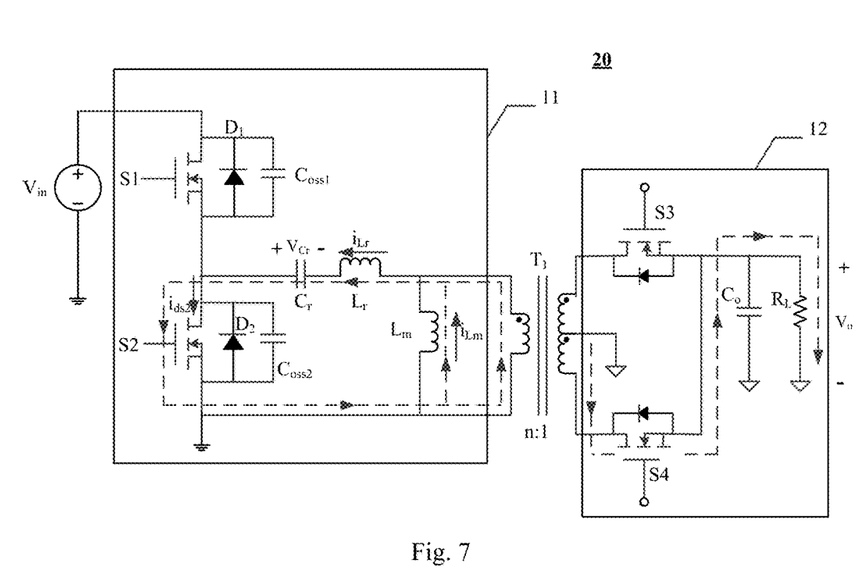
FIG. 7 schematically shows directions of currents in the resonant rectifying device during a fourth time segment of the operation period.

FIG. 7 schematically shows directions of various currents in the resonant rectifying device 20 during a certain period within the fourth time segment. As shown in FIG. 3, during the fourth time segment, the second MOS transistor S2 is first turned on and then the fourth MOS transistor S4 is turned on after a certain delay time. Thus, the primary-side module 11 transfers power to the secondary-side module 12, and the secondary-side module 12 stores power.

In the first, second, and third time segments, the first capacitor $C_r$ is being charged. In the fourth time segment, since the second MOS transistor S2 is turned on and forms a loop, the first capacitor $C_r$ starts to discharge. The voltage across the first capacitor $C_r$ is $$\frac{1}{2}V_{in} + i_{Lr} \cdot \frac{1}{2\pi \ fC_r},$$

where $V_{in}$ in the formula denotes the voltage of the power source $V_{in}$, $i_{Lr}$ in the formula denotes the current in the second inductor $L_r$, f in the formula denotes the resonant frequency of the resonant rectifying device 20, and $C_r$ in the formula denotes the capacitance of the first capacitor $C_r$. When the fourth MOS transistor S4 is turned on, power is transferred from the primary-side module 11 to the secondary-side module 12 via the fourth MOS transistor S4, and meanwhile the second capacitor $C_o$ is charged.

Further, as shown in FIG. 3, the fourth MOS transistor S4 is first turned off and then the second MOS transistor S2 is turned off at time t4. FIG. 7 shows the status of various currents in the resonant rectifying device 20 while both the second MOS transistor S2 and the fourth MOS transistor S4 are on.

Figure 8:
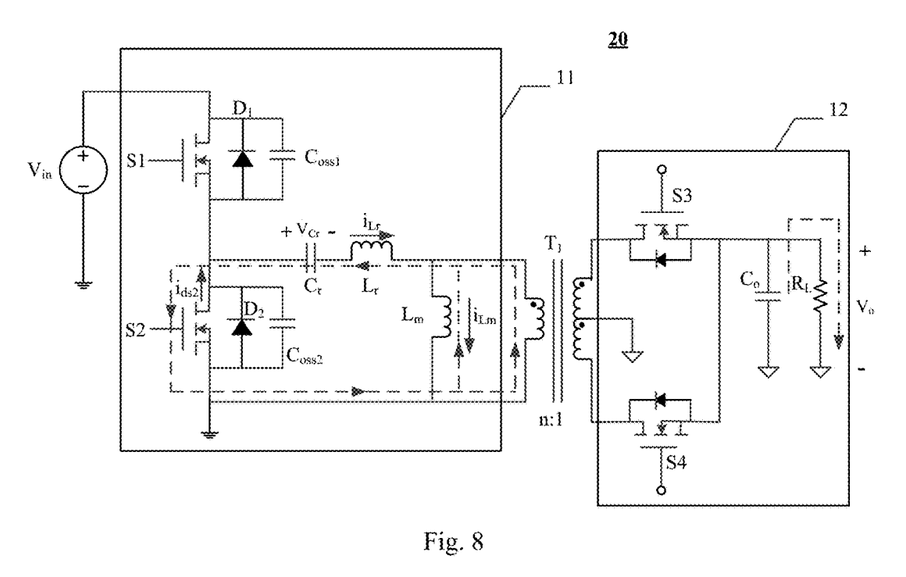
FIG. 8 schematically shows directions of currents in the resonant rectifying device during a fifth time segment of the operation period.

FIG. 8 schematically shows directions of various currents in the resonant rectifying device 20 within the fifth time segment. As shown in FIG. 3, during the fifth time segment, the first MOS transistor S1, the second MOS transistor S2, the third MOS transistor S3, and the fourth MOS transistor S4 are turned off. As shown in FIG. 8, during the fifth time segment, the primary-side module 11 stops transferring power to the secondary-side module 12, and the secondary-side module 12 starts to output power.

The first junction capacitor $C_{oss1}$ of the first MOS transistor S1 discharges when the second MOS transistor S2 is turned off completely, such that the first MOS transistor S1 is in a zero voltage switching state when it is turned on again. Meanwhile, due to properties of the inductor, in the primary-side module 11, current does not disappear instantaneously and continuity of the resonant current can be ensured.

According to the present disclosure, the MOS transistors of the resonant rectifying device 20 are controlled to be turned on alternatively by a control apparatus, and thus influence of magnetic flux leakage on the load can be effectively avoided. By replacing the rectifying diodes in the secondary side with MOS transistors, synchronous rectifying is realized, converting efficiency is increased, operating stability of the load apparatus is increased, the load apparatus is effectively protected, and damage to the load apparatus is prevented. In addition, zero voltage switching technology may be utilized to lower the power consumption of the MOS transistors. In addition, the second inductor $L_r$ is added in the primary side, such that the decrease of inductance in the primary side due to inductance leakage can be compensated. Therefore, the actual resonant frequency of the resonant rectifying device 20 may equal or be greater than the theoretical resonant frequency, such that the resonant point may fall within an inductive region. Consequently, inductance leakage is avoided and power converting efficiency is improved.

In some embodiments, the time periods during which the third MOS transistor S3 and the fourth MOS transistor S4 are turned on are set to be respectively shorter than the time periods during which the first MOS transistor S1 and the second MOS transistor S2 are turned on. Hereinafter, the time period during which an MOS transistor is turned on is also referred to as an on-time of the MOS transistor. According to the present disclosure, the on-times of the first and the second MOS transistors S1 and S2 can be calculated using the following equation:

$$T = 2\pi\sqrt{L_r C_r}$$

where T in the equation denotes the on-time of the first MOS transistor S1 or the second MOS transistor S2, $L_r$ in the equation denotes the inductance value of the second inductor $L_r$ in the primary-side module 11, and $C_r$ in the equation denotes the capacitance value of the first capacitor $C_r$ in the primary-side module 11.

Figure 9:
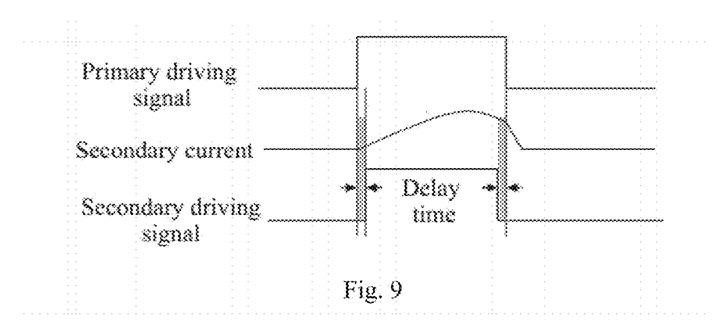
FIG. 9 is a schematic diagram of a primary driving signal and a secondary driving signal of a resonant rectifying device according to an exemplary embodiment.

FIG. 9 is a schematic diagram of a primary driving signal and a secondary driving signal of a resonant rectifying device, such as the resonant rectifying device 10 or the resonant rectifying device 20, according to an exemplary embodiment. The primary driving signal is a driving signal for controlling the on/off state of the first MOS transistor S1 or the second MOS transistor S2, and the secondary driving signal is a driving signal for controlling the on/off state of the third MOS transistor S3 or the fourth MOS transistor S4. As shown in FIG. 9, a pulse width of the secondary driving signal is narrower than a pulse width of the primary driving signal. That is, a rising edge of the secondary driving signal is delayed for a certain delay time, also referred to herein as an "on-delay time," after a rising edge of the primary driving signal, while a falling edge of the primary driving signal is delayed for a certain delay time, also referred to herein as an "off-delay time," after a falling edge of the secondary driving signal. In some embodiments, each of the on-delay time and the off-delay time is set as 10% of the pulse width of the primary driving signal.

In some embodiments, the on-delay time is set in consideration of factors, such as switch delay, duty ratio, and the like, of the MOS transistors of the primary side. That is, when the current value is not positive, the secondary driving signal cannot be at the high level. Otherwise, reverse current may flow back to the primary side. The off-delay time is set in consideration of the switch delay of the MOS transistors in the secondary side. That is, when the current is still decreasing, the secondary driving signal should turn to the low level in advance. Otherwise, reverse current may occur.

Figure 10:
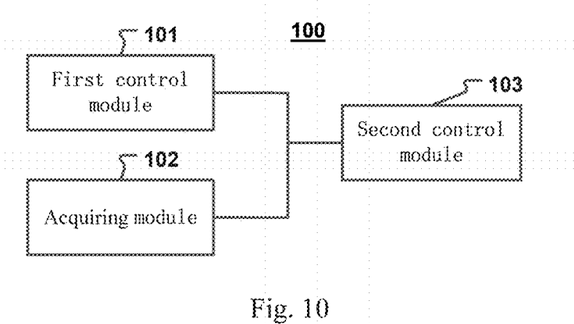
FIG. 10 is a block diagram of a control apparatus for controlling a resonant rectifying device according to an exemplary embodiment.

FIG. 10 is a block diagram of a control apparatus 100 for controlling a resonant rectifying device consistent with the present disclosure, such as the resonant rectifying device 10 or the resonant rectifying device 20, according to an exemplary embodiment. As illustrated in FIG. 10, the apparatus includes a first control module 101, an acquiring module 102, and a second control module 103.

The first control module 101 is configured to control the first MOS transistor Si to turn on at time t0 of an operating period of the resonant rectifying device. At time t0, the third MOS transistor S3 is kept off. Thus, the primary-side module 11 receives power from the power source $V_{in}$. The first control module 101 controls the third MOS transistor S3 to turn on a certain delay time after the first MOS transistor S1 is turned on, such that the power stored in the primary-side module 11 is transferred to the secondary-side module 12 via the transformer $T_1$. The first control module 101 further controls the third MOS transistor S3 to turn off, such that the primary-side module 11 stops transferring power to the secondary-side module 12, and the secondary-side module 12 stores the power. After a certain delay time, i.e., at time t1, the first control module 101 controls the first MOS transistor S1 to turn off. As described above, the time period between t0 and t1 constitutes the first time segment of the operating period.

The first control module 101 is further configured to keep the first MOS transistor S1, the second MOS transistor S2, the third MOS transistor S3, and the fourth MOS transistor S4 off during the second time segment, i.e., from t1 to t2, of the operating period, such that the second junction capacitor $C_{oss2}$ of the second MOS transistor S2 discharges. The second MOS transistor S2 is in a zero voltage switching state when it is turned on next time. Further, the first junction capacitor $C_{oss1}$ of the first MOS transistor S1 is charged until the voltage across two ends of the first junction capacitor $C_{oss1}$ reaches the power source voltage.

The first control module 101 is further configured to keep the first MOS transistor S1, the second MOS transistor S2, the third MOS transistor S3, and the fourth MOS transistor S4 off during the third time segment, i.e., from t2 to t3, of the operating period, such that the primary-side module 11 does not transfer power to the secondary-side module 12, and the secondary-side module 12 outputs power.

The first control module 101 is further configured to control the second MOS transistor S2 and the fourth MOS transistor S4 to turn on successively and then to turn off successively, during the fourth time segment, i.e., from t3 to t4, of the operating period, such that the primary-side module 11 transfers power to the secondary-side module 12, and the secondary output module 12 stores power.

The first control module 101 is further configured to control the first MOS transistor S1, the second MOS transistor S2, the third MOS transistor S3, and the fourth MOS transistor S4 to keep off during the fifth time segment, i.e., from t4 to t5, such that the first junction capacitor $C_{oss1}$ of the first MOS transistor discharges. The first MOS transistor S1 is in a zero voltage switching state when it is turned on next time. Meanwhile, the primary-side module 11 transfers power to the secondary-side module 12, and the secondary-side module 12 outputs power.

The acquiring module 102 is configured to acquire the on-times of the first MOS transistor S1 and the second MOS transistor S2 according to the following equation:

$$T = 2\pi\sqrt{L_r C_r}$$

wherein T in the equation denotes the on-time of the first MOS transistor S1 or the second MOS transistor S2, $L_r$ in the equation denotes the inductance value of the second inductor $L_r$ in the primary-side module 11, and $C_r$ in the equation denotes the capacitance value of the first capacitor $C_r$ in the primary-side module 11.

The second control module 103 is configured to control the on-delay time for which the third MOS transistor S3 is turned on after the first MOS transistor S1 is turned on or for which the fourth MOS transistor S4 is turned on after the second MOS transistor S2 is turned on, and to control the off-delay time for which the first MOS transistor S1 is turned off after the third MOS transistor S3 is turned off or for which the second MOS transistor S2 is turned off after the fourth MOS transistor S4 is turned off.

Operations performed by the above modules are similar to the exemplary methods described above, and thus detailed description thereof is omitted here.

The above function of the control apparatus for resonant rectifying may also be implemented by a circuit of a control apparatus as follow.

Figure 11:
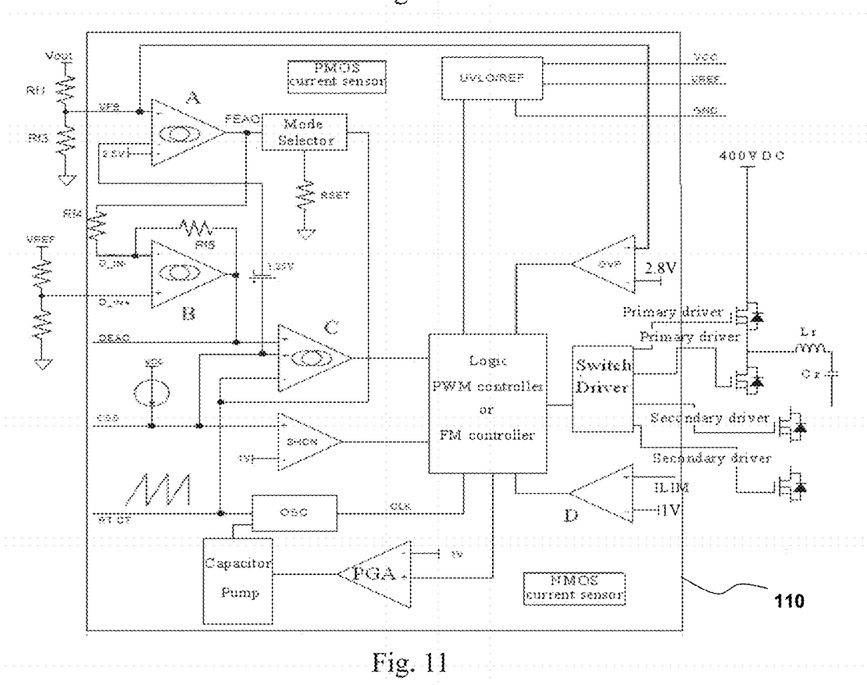
FIG. 11 is a circuit diagram of a control apparatus for controlling a resonant rectifying device according to another exemplary embodiment.

FIG. 11 is a circuit diagram of a control apparatus 110 for controlling a resonant rectifying device consistent with the present disclosure, such as the resonant rectifying device 20, according to an exemplary embodiment. According to the present disclosure, when the resonant rectifying circuit is in a light-load mode or an idle mode, the control apparatus 110 adopts a frequency conversion approach, such as a frequency modulation (FM) control mode, to maintain a high efficiency, as described below. That is, when the resonant rectifying device is in the light-load mode or the idle mode, an output voltage Vout of the resonant rectifying device, i.e., Vo in FIGS. 1, 2, and 4-8, is lowered. The output voltage Vout is fed back to the control apparatus 110 through a voltage division network including resistors Rf1 and Rf3. Thus, since the output voltage Vout is lowered, the voltage VFB at a positive input terminal of an amplifier A of the control apparatus 110 is lowered. As such, an output terminal of the amplifier A, referred to as FEAO (Feedback Error Amplifier Output) in FIG. 11, is at a low level that is lower than an internal reference voltage of a mode selection circuit (Mode Selector) coupled to the output terminal of the amplifier A. Thus, the mode selection circuit outputs a high level to a negative input terminal of an amplifier C. An output signal of the amplifier C passes through a logic control circuit (Logic PWM controller or FM controller), and the logic control circuit selects the FM control mode. Substantially, the logic control circuit changes a charge/discharge time constant of a charge pump (Capacitor Pump) by controlling a programmable gain amplifier (PGA) coupled between the logic control circuit and the charge pump. At this time, an external capacitance/resistance (CT/RT) signal, which determines a lowest resonant frequency of the resonant rectifying device, is disabled. Charge and discharge of the charge pump is controlled by the PGA, so as to control the magnitude of the slope of a zigzag wave generated by a crystal oscillator (OSC) (provided that power storage in each operation period of the resonant rectifying device is identical). The zigzag wave is compared with the output current $i_o$ of the resonant rectifying device by an internal comparator (not shown) in the logic control circuit to change the frequency of driving signals, which are output by the control apparatus 110 to drive MOS transistors, e.g., the MOS transistors S1 and S2, in the primary side of the resonant rectifying device and synchronous rectification MOS transistors, e.g., the MOS transistors S3 and S4, in the secondary side, respectively, thereby realizing the FM control.

On the other hand, when the load of the resonant rectifying device is in a full-load mode, the control apparatus 110 does not need frequency conversion and is in a resonant state, i.e., operating in a pulse width modulation (PWM) control mode. In this scenario, the output voltage Vout increases, and the voltage VFB at the positive input terminal of the amplifier A, obtained through the voltage division networks Rf1 and Rf3, also increases. At this time, the output terminal FEAO of the amplifier A is at a high level. The output of the mode selection circuit is coupled to the negative input terminal of the amplifier C, which outputs a control signal to the logic control circuit to select the PWM control mode. Similar to the light-load scenario, the output current $i_o$ of the resonant rectifying device is compared with the zigzag wave by the internal comparator in the logic control circuit. Four driving signals are output to drive MOS transistors, e.g., the MOS transistors S1 and S2, in the primary side and synchronous rectification MOS transistors, e.g., the MOS transistors S3 and S4, in the secondary side, respectively, thereby realizing the PWM control. When the output current $i_o$ of the resonant rectifying device reaches a maximum threshold current, the voltage value of the output voltage $V_o$ of the resonant rectifying device sampled by a detection terminal ILIM, which is coupled to a positive input terminal of an amplifier D, is compared in the amplifier D with a reference voltage of 1 V. The amplifier D controls a selection switch inside the logic control circuit, i.e., a terminal of the logic control circuit.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A non-transitory computer-readable storage medium having stored therein instructions for controlling a resonant rectifying device, wherein the resonant rectifying device includes:
   a transformer having a primary winding and a secondary winding;
   a primary-side circuit coupled to the primary winding of the transformer, the primary-side circuit including:
      a first field effect transistor (FET) and a second FET coupled in series between a voltage source and a ground;
      a capacitor, a first side of the capacitor being coupled to a point between the first and the second FETs; and
      an inductor, a first end of the inductor being coupled to one end of the primary winding and to a second side of the capacitor, and a second end of the inductor being coupled to the ground, wherein the inductor is a first inductor, and the primary-side circuit further includes a second inductor coupled in series between the capacitor and the first inductor; and
   a secondary-side circuit coupled to the secondary winding of the transformer, the secondary-side circuit includes:
      a third FET, a first end of the third FET being coupled to a first end of the secondary winding; and
      a fourth FET, a first end of the fourth FET being coupled to a second end of the secondary winding, wherein a second end of the third FET and a second end of the fourth FET are coupled to each other, and are coupled to an output terminal of the secondary-side circuit; and
   wherein the instructions, when executed by one or more processors of a control apparatus for controlling the resonant rectifying device, cause the control apparatus to:
   during a first time segment of an operating period of the resonant rectifying device:
      control the first FET to turn on;
      control the third FET to turn on after an on-delay time after the first FET is turned on;
      control the third FET to turn off; and
      control the first FET to turn off after an off-delay time after the third FET is turned off;
   during a second time segment of the operating period after the first time segment:
      control the first FET, the second FET, the third FET, and the fourth FET to keep off;
   during a third time segment of the operating period after the second time segment:
      control the first FET, the second FET, the third FET, and the fourth FET to keep off;

during a fourth time segment of the operating period after the third time segment:
control the second FET to turn on;
control the fourth FET to turn on after the on-delay time after the second FET is turned on;
control the fourth FET to turn off; and
control the second FET to turn off after the off-delay time after the fourth FET is turned off; and
during a fifth time segment of the operating period after the fourth time segment:
control the first FET, the second FET, the third FET, and the fourth FET to keep off.

2. The non-transitory storage medium according to claim 1, wherein the instructions further cause the control apparatus to:
acquire an on-time, during which the first FET or the second FET is turned on, according to the following equation:

$$T=2\pi\sqrt{L_r C_r},$$

wherein T denotes the on-time, $L_r$ denotes an inductance value of the second inductor, and $C_r$ denotes a capacitance value of the capacitor.

3. A control method for controlling a resonant rectifying device, wherein the resonant rectifying device includes:
a transformer having a primary winding and a secondary winding;
a primary-side circuit coupled to the primary winding of the transformer, the primary-side circuit including:
a first field effect transistor (FET) and a second FET coupled in series between a voltage source and a ground;
a capacitor, a first side of the capacitor being coupled to a point between the first and the second FETs; and
an inductor, a first end of the inductor being coupled to one end of the primary winding and to a second side of the capacitor, and a second end of the inductor being coupled to the ground, wherein the inductor is a first inductor, and the primary-side circuit further includes a second inductor coupled in series between the capacitor and the first inductor; and
a secondary-side circuit coupled to the secondary winding of the transformer, the secondary-side circuit includes:
a third FET, a first end of the third FET being coupled to a first end of the secondary winding; and
a fourth FET, a first end of the fourth FET being coupled to a second end of the secondary winding;
wherein a second end of the third FET and a second end of the fourth FET are coupled to each other, and are coupled to an output terminal of the secondary-side circuit;
the method comprising:
during a first time segment of an operating period of the resonant rectifying device:
controlling the first FET to turn on;
controlling the third FET to turn on after an on-delay time after the first FET is turned on;
controlling the third FET to turn off; and
controlling the first FET to turn off after an off-delay time after the third FET is turned off;
during a second time segment of the operating period after the first time segment:
controlling the first FET, the second FET, the third FET, and the fourth FET to keep off;
during a third time segment of the operating period after the second time segment:
controlling the first FET, the second FET, the third FET, and the fourth FET to keep off;
during a fourth time segment of the operating period after the third time segment:
controlling the second FET to turn on;
controlling the fourth FET to turn on after the on-delay time after the second FET is turned on;
controlling the fourth FET to turn off; and
controlling the second FET to turn off after the off-delay time after the fourth FET is turned off; and
during a fifth time segment of the operating period after the fourth time segment:
controlling the first FET, the second FET, the third FET, and the fourth FET to keep off.

4. The method according to claim 3, further comprising:
acquiring an on-time, during which the first FET or the second FET is turned on, according to the following equation:

$$T=2\pi\sqrt{L_r C_r},$$

wherein T denotes the on-time, $L_r$ denotes an inductance value of the second inductor, and $C_r$ denotes a capacitance value of the capacitor.

5. The method according to claim 4, wherein:
the on-time is a first on-time, and
the first on-time is greater than a second on-time, during which the third FET or the fourth FET is turned on.

6. A resonant rectifying device, comprising:
a transformer having a primary winding and a secondary winding;
a primary-side circuit coupled to the primary winding of the transformer, the primary-side circuit including:
a first field effect transistor (FET) and a second FET coupled in series between a voltage source and a ground;
a capacitor, a first side of the capacitor being coupled to a point between the first and the second FETs; and
an inductor, a first end of the inductor being coupled to one end of the primary winding and to a second side of the capacitor, and a second end of the inductor being coupled to the ground; and
a secondary-side circuit coupled to the secondary winding of the transformer, the secondary-side circuit includes:
a third FET, a first end of the third FET being coupled to a first end of the secondary winding; and
a fourth FET, a first end of the fourth FET being coupled to a second end of the secondary winding,
wherein a second end of the third FET and a second end of the fourth FET are coupled to each other, and are coupled to an output terminal of the secondary-side circuit; and
wherein when the resonant rectifying device is in a light-load mode or an idle mode, the resonant rectifying device adopts a frequency modulation (FM) control mode, and when the resonant rectifying device is in a full-load mode, the resonant rectifying device adopts a pulse width modulation (PWM) control mode.

7. The device according to claim 6, wherein:
the inductor is a first inductor, and
the primary-side circuit further includes a second inductor coupled in series between the capacitor and the first inductor.

8. A non-transitory computer-readable storage medium having stored therein instructions that, when executed by one or more processors of a control apparatus for controlling the resonant rectifying device according to claim 7, cause the control apparatus to:
  during a first time segment of an operating period of the resonant rectifying device:
    control the first FET to turn on;
    control the third FET to turn on after an on-delay time after the first FET is turned on;
    control the third FET to turn off; and
    control the first FET to turn off after an off-delay time after the third FET is turned off;
  during a second time segment of the operating period after the first time segment:
    control the first FET, the second FET, the third FET, and the fourth FET to keep off;
  during a third time segment of the operating period after the second time segment:
    control the first FET, the second FET, the third FET, and the fourth FET to keep off;
  during a fourth time segment of the operating period after the third time segment:
    control the second FET to turn on;
    control the fourth FET to turn on after the on-delay time after the second FET is turned on;
    control the fourth FET to turn off; and
    control the second FET to turn off after the off-delay time after the fourth FET is turned off; and
  during a fifth time segment of the operating period after the fourth time segment:
    control the first FET, the second FET, the third FET, and the fourth FET to keep off.

9. The non-transitory storage medium according to claim 8, wherein the instructions further cause the control apparatus to:
  acquire an on-time, during which the first FET or the second FET is turned on, according to the following equation:

$$T = 2\pi\sqrt{L_r C_r},$$

wherein T denotes the on-time, $L_r$ denotes an inductance value of the second inductor, and $C_r$ denotes a capacitance value of the capacitor.

10. A control method for controlling the resonant rectifying device according to claim 7, comprising:
  during a first time segment of an operating period of the resonant rectifying device:
    controlling the first FET to turn on;
    controlling the third FET to turn on after an on-delay time after the first FET is turned on;
    controlling the third FET to turn off; and
    controlling the first FET to turn off after an off-delay time after the third FET is turned off;
  during a second time segment of the operating period after the first time segment:
    controlling the first FET, the second FET, the third FET, and the fourth FET to keep off;
  during a third time segment of the operating period after the second time segment:
    controlling the first FET, the second FET, the third FET, and the fourth FET to keep off;
  during a fourth time segment of the operating period after the third time segment:
    controlling the second FET to turn on;
    controlling the fourth FET to turn on after the on-delay time after the second FET is turned on;
    controlling the fourth FET to turn off; and
    controlling the second FET to turn off after the off-delay time after the fourth FET is turned off; and
  during a fifth time segment of the operating period after the fourth time segment:
    controlling the first FET, the second FET, the third FET, and the fourth FET to keep off.

11. The method according to claim 10, further comprising:
  acquiring an on-time, during which the first FET or the second FET is turned on, according to the following equation:

$$T = 2\pi\sqrt{L_r C_r},$$

wherein T denotes the on-time, $L_r$ denotes an inductance value of the second inductor, and $C_r$ denotes a capacitance value of the capacitor.

12. The method according to claim 11, wherein:
  the on-time is a first on-time, and
  the first on-time is greater than a second on-time, during which the third FET or the fourth FET is turned on.

* * * * *